(12) United States Patent
Williams et al.

(10) Patent No.: US 10,367,818 B2
(45) Date of Patent: Jul. 30, 2019

(54) RESPONSE TO A MACHINE-READABLE LINK

(71) Applicant: Hewlett-Packard Development Company, L.P., Houston, TX (US)

(72) Inventors: Bruce Williams, San Diego, CA (US); Sabrina Kwan, San Diego, CA (US); Robert B Taylor, Washougal, WA (US); Godavari Srinivasu, Bangalore (IN); Sriganesh Madhvanath, Pittsford, NY (US); Pam Lennan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 153 days.

(21) Appl. No.: 15/307,170

(22) PCT Filed: Apr. 30, 2014

(86) PCT No.: PCT/US2014/036058
§ 371 (c)(1),
(2) Date: Oct. 27, 2016

(87) PCT Pub. No.: WO2015/167499
PCT Pub. Date: Nov. 5, 2015

(65) Prior Publication Data
US 2017/0063864 A1 Mar. 2, 2017

(51) Int. Cl.
*H04L 29/06* (2006.01)
*G06F 16/955* (2019.01)
(Continued)

(52) U.S. Cl.
CPC ........ *H04L 63/101* (2013.01); *G06F 16/9558* (2019.01); *G06F 21/31* (2013.01);
(Continued)

(58) Field of Classification Search
CPC ................. H04L 63/101; H04L 63/105; G06F 17/30882; G06K 19/06037; G06K 7/1417
See application file for complete search history.

(56) References Cited

U.S. PATENT DOCUMENTS 8,015,183 B2    9/2011    Frank et al.
8,023,691 B2    9/2011    Rodriguez et al.
(Continued)

FOREIGN PATENT DOCUMENTS

EP         2482210 A2      8/2012
KR      20100013038 A      2/2010
(Continued)

OTHER PUBLICATIONS

Bulterman, et al. "Structured Multimedia Authoring", < http//pdf.aminer.org/>, 2005 ~ 25 pages.
(Continued)

*Primary Examiner* — Hee K Song
(74) *Attorney, Agent, or Firm* — Trop Pruner & Hu PC; Michael A Dryja

(57) ABSTRACT

A system receives a user identifier and a link identifier to identify a machine-readable link in an image captured by a first device. In response to determining that the user identifier indicates a user having an administrative privilege with respect to the machine-readable link, the system sends, to the first device, a response containing information to allow performance of management with respect to the machine-readable link.

13 Claims, 5 Drawing Sheets

(51) Int. Cl.
*G06F 21/31* (2013.01)
*G06K 7/14* (2006.01)
*G06K 19/06* (2006.01)

(52) U.S. Cl.
CPC ..... *G06K 7/1417* (2013.01); *G06K 19/06037* (2013.01); *H04L 63/105* (2013.01)

(56) References Cited

U.S. PATENT DOCUMENTS

| | | | |
|---|---|---|---|
| 8,090,146 B2 | 1/2012 | Seshadri et al. | |
| 8,180,844 B1 | 5/2012 | Rhoads et al. | |
| 8,413,882 B1* | 4/2013 | Nidamarthi | G06Q 30/00 235/375 |
| 8,447,144 B2 | 5/2013 | King et al. | |
| 8,573,475 B2 | 11/2013 | Zuleeg | |
| 8,606,493 B1 | 12/2013 | Gold et al. | |
| 8,611,919 B2 | 12/2013 | Barnes, Jr. | |
| 9,218,610 B2* | 12/2015 | Kandregula | G06Q 30/0241 |
| 9,952,847 B1* | 4/2018 | Comer | H04L 67/34 |
| 2005/0224571 A1 | 10/2005 | Kelley et al. | |
| 2006/0168300 A1 | 7/2006 | An et al. | |
| 2007/0059674 A1 | 3/2007 | Takano et al. | |
| 2009/0262946 A1 | 10/2009 | Dunko | |
| 2011/0264527 A1* | 10/2011 | Fitzpatrick | G06Q 30/02 705/14.55 |
| 2012/0205439 A1* | 8/2012 | Frad | G06Q 30/0609 235/375 |
| 2012/0234907 A1 | 9/2012 | Clark et al. | |
| 2012/0278242 A1* | 11/2012 | Griffith | G06Q 30/02 705/304 |
| 2012/0278721 A1 | 11/2012 | Beidel | |
| 2013/0031593 A1 | 1/2013 | Booth | |
| 2013/0112760 A1 | 5/2013 | Schory et al. | |
| 2013/0167208 A1* | 6/2013 | Shi | H04L 63/18 726/5 |
| 2013/0185657 A1 | 7/2013 | Gunawardena et al. | |
| 2013/0198004 A1* | 8/2013 | Bradley | G06Q 30/0267 705/14.64 |
| 2014/0223175 A1* | 8/2014 | Bhatnagar | G09C 5/00 713/159 |
| 2014/0372427 A1* | 12/2014 | Lehmann | G06F 17/30247 707/736 |
| 2015/0008257 A1* | 1/2015 | Beadles | G06F 17/30879 235/375 |
| 2015/0213434 A1* | 7/2015 | Fletcher | G06Q 20/20 705/14.27 |
| 2016/0253732 A1* | 9/2016 | Brown | G06Q 10/00 235/462.11 |
| 2016/0371470 A1* | 12/2016 | Prabhu | G06K 7/00 |

FOREIGN PATENT DOCUMENTS

| | | |
|---|---|---|
| WO | WO-2013158406 A2 | 10/2013 |
| WO | WO-2014024197 A1 | 2/2014 |

OTHER PUBLICATIONS

Chen, "Quicktime VR—An Image-based Approach to Virtual Environment Navigation", <http://www.cs.columbia.edu >, 1995 ~ 10 pages.

Kaywa, "What is a dynamic QR Code? And how do I create one?," (Web page), Dec. 29, 2013, <http://web.archive.org/web>, 3 pages.

Knight, "Virtual Software in Reality", < http://etheses.dur.ac.uk/4244/1/4244_1764.pdf >, 2000, First 21 pages of 205 pages.

Muller, E.I., Scan Anything and Let Your Phone Do the Rest, (Web Page), Oct. 25, 2011, <http://www.technologyreview.com/news/>, 3 pages.

QRSTUFF.com, Password Protected QR Codes, Oct. 31, 2011, http://www.qrstuff.com/blog/2011/10/31/password-protected-qr-codes (3 pages).

Scanlife, "Analytics Engine," Jan 8, 2014, <http://www.scanlife.com/analytics-engine>, 2 pages.

Scanlife, "Code Actions," Jan 8, 2014, <http://www.scanlife.com/code-actions>, ~ 3 pages.

Scanlife, "Helping Marketers Detiver Mobile Engagement with QR Codes on Steroids," Jan. 24, 2013, <http://www.scanlife.com/blog/2013/>, 2 pages.

Scanlife, "QR Code Generation Pricing Plans: Enterprise" Jan. 8, 2014, <http://www.scanlife.com/pricing>, 3 pages.

Scanlife, "ScanLife QR Code Creation Plans,'" Jan 8, 2014, <http://www.scanlife.com/pricing>, 2 pages.

Scanlife, Our QR Codes Speak Your Language, Nov. 5, 2012, http://www.scanlife.com/blog/2012/11/our-qr-codes-speak-your-language/ (2 pages).

TechSmith.com, "Add Interactive Hotspots to Your Video," (Web page), retrieved on Jun. 9, 2014 at http://www.techsmith.com/tutorial, 5 pages.

\* cited by examiner

RESPONSE TO A MACHINE-READABLE LINK

BACKGROUND

Various types of machine-readable links, such as one- or two-dimensional barcodes, digital watermarks, images, text, and the like, may be optically readable by a computing device with an image capture device. Such machine-readable links may be encoded or associated with various types of information. In some examples, a machine-readable link may be encoded or associated with information identifying content accessible over a network.

BRIEF DESCRIPTION OF THE DRAWINGS

Some implementations are described with respect to the following figures.

DETAILED DESCRIPTION

Figure 1A:
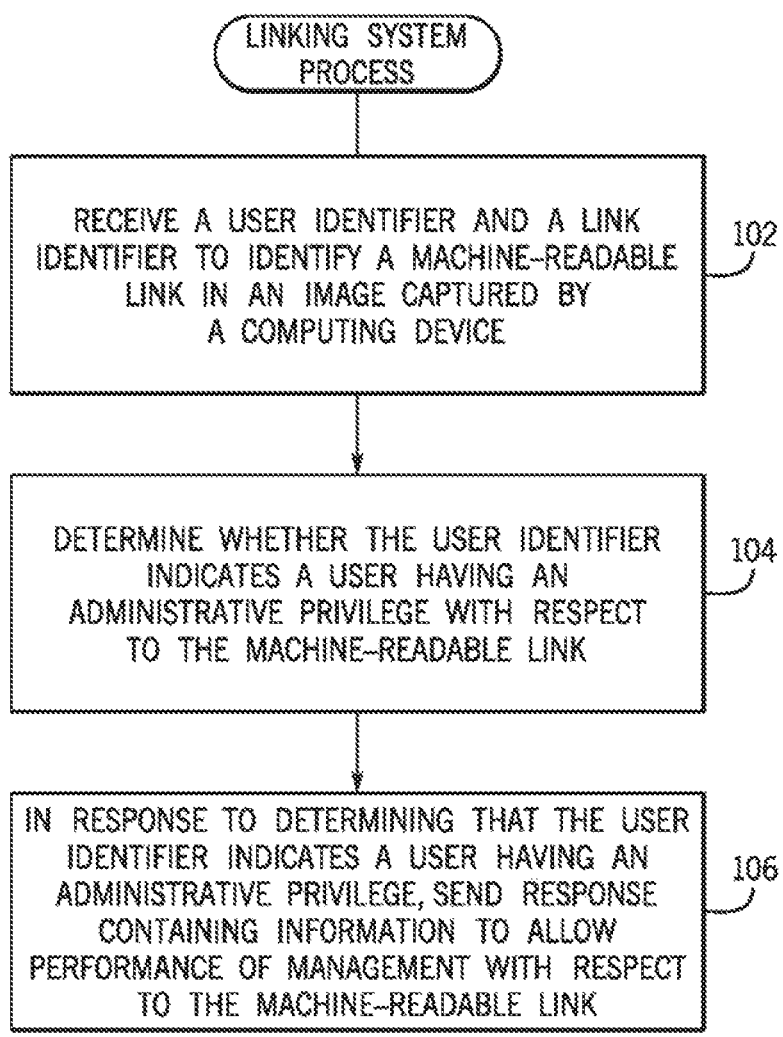
FIGS. 1A and 1B are flow diagrams of processes performed by a linking system, according to various implementations.

In some implementations, a machine-readable link can refer to an image associated with a linking system that is optically readable by a computing device, using an image capture device (e.g. a camera, a scanner, or any other device capable of capturing an image of a target object), to determine payload information with which the computing device may obtain access to content assigned to the image by the linking system. A computing device may provide payload information, determined from a captured image of a machine-readable link, to the linking system to access content associated with the machine-readable link by the linking system. In such examples, the determined payload information provided to the linking service may indicate to the linking system that the computing device captured the machine-readable link with an image capture device. In some examples, a computing device can refer to a desktop computer, a laptop (or notebook) computer, a workstation, a tablet computer, a mobile phone, a smart device, a server, a blade enclosure, or any other processing device or equipment.

A machine-readable link can include at least one of a bar code (e.g. a one-dimensional bar code, a two-dimensional bar code, a matrix bar code, a QUICK RESPONSE CODE (QR CODE), or the like), a digital watermark, a target image such as a printed photograph, target text, a three-dimensional object (e.g. a building, a sign, etc.), or the like. In some examples, a machine-readable link can include the payload information encoded or embedded in the machine-readable link. In some examples, a machine-readable link such as digital watermark can include the payload information encoded or embedded in a carrier image. In other examples, a machine-readable link may not contain encoded or embedded payload information. In such other examples, a computing device using an image capture device may determine the payload information based on features, characteristics, or other aspects of the machine-readable link.

In some implementations, "content" assigned to a machine-readable link may be any suitable type of information that may be accessed (e.g. retrieved, viewed, etc.) over a network, such as video data, audio data, image data, a web page, a uniform resource identifier (URI) (such as a uniform resource locator (URL)) for web content, or the like. Content assigned to a machine-readable link can also be referred to as "payoff content." As used herein, a network can include, for example, a local area network (LAN), a wireless local area network (WLAN), a virtual private network (VPN), the Internet, or the like, or a combination thereof. In some examples, a network can include a telephone network (e.g. a cellular telephone network).

In some implementations, a "linking system" can be a system implemented by one or more computing devices to create and manage machine-readable links, and to create and manage the assignment of content to respective machine-readable links. In some examples, a linking system can assign content to respective machine-readable links and provide access, by a computing device, to the payoff content assigned to a given machine-readable link in response to an indication that the computing device has captured an image of the given machine-readable link.

A link producer can refer to a user that specifies payoff content to be associated with a machine-readable link. A link consumer can refer to a user that seeks to retrieve (such as for viewing or for another purpose) the payoff content of a machine-readable link.

A link producer may dynamically vary the payoff content associated with a given machine-readable link, based on one or multiple factors. For example, the link producer may specify that different payoff content is to be associated with the given machine-readable link at different times. Varying the payoff content for different times can be performed for purposes of recycling the given machine-readable link over time. For example, during a first time interval, the link producer can specify that first advertising content is to be associated with the given machine-readable link. In a second time interval, the link producer can specify that different advertising content is to be associated with the given machine-readable link. In this manner, the link producer does not have to acquire different machine-readable links for different payoff content does not have to be obtained for different payoff content).

More generally, the link producer may specify that different payoff content is to be associated with the given machine-readable link based on one or, multiple factors selected from among any or some combination of the following: a location of a computing device that detected the given machine-readable link, a timestamp from the computing device, historical data associated with usage of the given machine-readable link, information about characteristics of the computing device, information about an environment of the computing device, and information about the link consumer.

Traditionally, to manage association of payoff content with a machine-readable link, a link producer may use management portal, which can be a website or another portal. The link producer can log into the management portal. Once logged into the management portal, the link producer can search for a target machine-readable link that is to be updated, and the link producer can then perform a link updating workflow to update the payoff content of the machine-readable link. However, such a process for managing a machine-readable link may not be convenient to use, especially for a user who is not familiar with the management portal or who does not remember specific information about the machine-readable link to be managed.

In accordance with some implementations, techniques or mechanisms are provided to allow for more convenient performance of management tasks with respect to machine-readable links. FIG. 1A is a flow diagram of a process that can be performed by a linking system according to some implementations. The linking system receives (at 102) a user identifier and a link identifier to identify a machine-readable link in an image captured by a computing device. In some implementations, the user identifier and the link identifier may be included in a message received by the linking system from the computing device, where the message provides an indication that the computing device has detected the machine-readable link.

A user identifier can uniquely identify a user, and can include any one or some combination of the following: text, characters, symbols, an image, and so forth. For example, the user identifier can be a username, an email address, and so forth. Alternatively, a user identifier can uniquely identify a computing device (or a set of computing devices) that is associated with a user (or multiple users). For example, the user identifier can be an address or a set of addresses, such as one or multiple Medium Access Control (MAC) addresses or other types of addresses of the computing device(s) associated with the user(s).

A link identifier can uniquely identify a respective machine-readable link. The link identifier can be derived based on detection by the computing device of the respective machine-readable link in an image captured by the computing device. As an example, the computing device can be derived by decoding the link identifier in the captured image. As another example, the computing device can compare the captured image to a database of images containing machine-readable links to identify a matching one of the machine-readable links. The database can contain link identifiers for the respective machine-readable links. The link identifier for the matching machine-readable link can be retrieved from the database for use as the link identifier of the detected machine-readable link.

The linking system determines (at 104) whether the user identifier indicates a user having an administrative privilege with respect to the machine-readable link. As noted above, the user identifier can be an identifier of a user, or alternatively, can be an identifier of a computing device used by the user. The user identifier indicates a user having an administrative privilege if the user identifier identifies such a user, or the user identifier identifies a computing device of the user. A user having an administrative privilege can be a link producer, for example, or any other user that has been designated to have the administrative privilege. For example, the link producer may designate that one or multiple other users can have an administrative privilege with respect to the machine-readable link. A user having an administrative privilege with respect to the machine-readable link is a user that can perform a management task with respect to the machine-readable link, such as to view analytics information associated with the machine-readable link, update payoff content of the machine-readable link, or another management task (example management tasks are discussed further below).

In response to determining (at 104) that the user identifier indicates a user having the administrative privilege with respect to the machine-readable link, the linking system sends (at 106), to the computing device, a response containing information to allow performance of management with respect to the machine-readable link.

In further implementations, the sending of the response to allow performance of management with respect to the machine-readable link can further be based on an identifier of an application that sent a request that includes the user identifier and the link identifier. The identifier of the application can be used to confirm that the application is capable of performing the management. If the linking system determines that the identified application at the computing device is not capable of performing the management with respect to the machine-readable link, then the linking system can decide not to send the response to computing device to allow performance of management with respect to the machine-readable link.

In some examples, the information contained in the response can include analytics information that relates to past usage with respect to the machine-readable link. For example, the analytics information can include the number of times the machine-readable link was detected in images captured by one or multiple computing devices. The analytics information can also record the types (e.g. brands, models, etc.) of computing devices that have been used to capture images containing the machine-readable link. The analytics information can also identify characteristics of such computing devices, including types of operating systems, types of processors, and so forth. Additionally, the analytics information can include information specifying usage of payoff content associated with the machine-readable link. For example, the analytics information can indicate whether a link consumer clicked on a hyperlink included in the payoff content, a length of time the payoff content was viewed, whether the payoff content was forwarded by the link consumer to another user, and so forth.

Other examples of management tasks can include modification of the payoff content of the machine-readable link. The link producer can change the payoff content of the machine-readable link, or the link producer can delete and insert a new payoff content for the machine-readable link.

Another example of a management task that can be performed with respect to the machine-readable link is the specification of a location of the machine-readable link. A link producer can communicate location information of an object that includes the machine-readable link, and this information can be recorded in a database that correlates machine-readable links to their corresponding locations. As an example, at a conference, sporting event, retail store, and so forth, there can be a high density of objects containing respective machine-readable links (where the objects can be in close proximity with each other). The density of the objects can be such that Global Positioning System (GPS) coordinates obtained by GPS receivers may not be adequate to distinguish locations of the objects. In other examples, the objects may be located in a building where GPS receivers are unable to obtain GPS signals. To address the foregoing issues, an administrative user can manually specify the location of a given object that contains a machine-readable link, and communicate that location to a remote system.

FIG. 18 is a flow diagram of a process that can be performed by a linking system according to further implementations. The linking system receives (at 120) a user identifier and a link identifier to identify a machine-readable link in an image captured by a computing device.

The linking system determines (at 122) whether the user identifier indicates a link consumer or a user having an administrative privilege with respect to the machine-readable link. In response to determining (at 122) that the user identifier indicates a link consumer, the linking system sends (at 124) payoff content of the machine-readable link to the computing device, for viewing or other use at the computing device.

On the other hand, in response to determining at 122) that the user identifier indicates a user having the administrative privilege with respect to the machine-readable link, the linking system sends (at 126), to the computing device, a response containing information to allow performance of management with respect to the machine-readable link.

Figure 2:
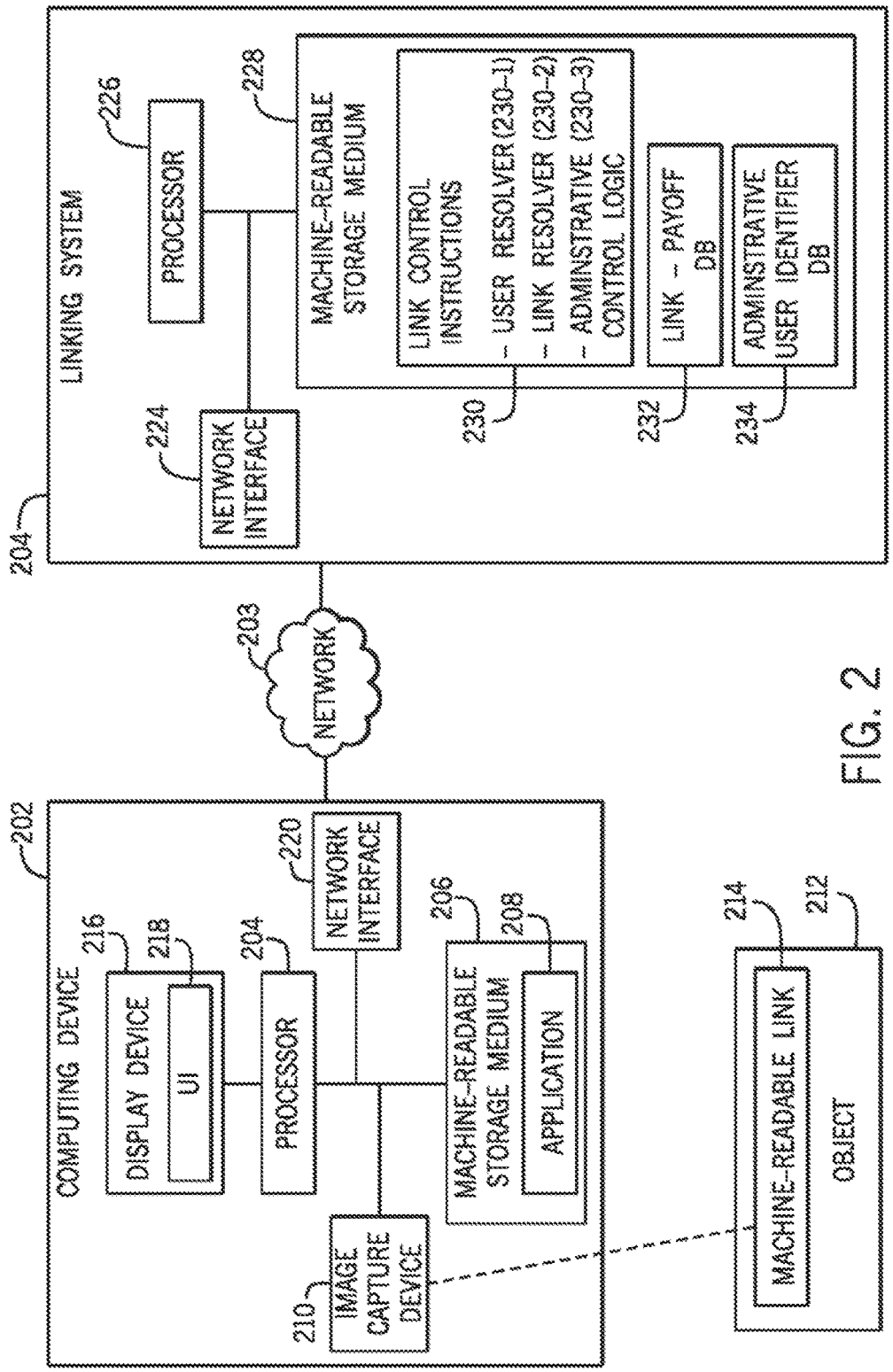
FIG. 2 is a block diagram of an example arrangement including a computing device and a linking system, according to some implementations.

FIG. 2 is a block diagram of an example arrangement that includes a computing device 202 and a linking system 204. The linking system 204 can communicate with the computing device 202 over a network 203. Although just one computing device 202 and one linking system 204 is shown in FIG. 2, it is noted that in other implementations, multiple computing devices 202 and/or multiple linking systems 204 can be provided.

The computing device 202 includes one or multiple processors 204 and a non-transitory machine-readable storage medium (or storage media) 206, which can store an application 208. The application 208 can be in the form of machine-readable instructions executable on the processor(s) 204. A processor can include a microprocessor, microcontroller, processor module or subsystem, programmable integrated circuit, programmable gate array, or another control or computing resource. The computing device 202 includes a network interface 220 that is able to communicate over the network 203.

A machine-readable storage medium can refer to any electronic, magnetic, optical, or other physical storage apparatus to contain or store information, such as executable instructions, data, and the like. For example, any machine-readable storage medium described herein may be any of a dynamic or static random access memory, an erasable and programmable read-only memory (EPROM), an electrically erasable and programmable read-only memory (EEPROM), a flash memory, disk-based storage device such as a magnetic disk drive or optical disk drive, a solid state drive or another types of storage device.

The application 208 can be an application used to perform access of payoff content of machine-readable links or management of machine-readable links. In some implementations, the application 208 can be selectively set to a consumer mode and an administrative mode. In the consumer mode, the application 208 is used for the purpose of retrieving and viewing for otherwise using) payoff content associated with a machine-readable link. In the administrative mode, the application 208 can be used to perform management tasks (such, as those discussed above) with respect to the machine-readable link.

In other examples, different applications can be used by a link consumer and an administrative user, respectively. A first application can be invoked by a link consumer to access payoff content of a machine-readable link. A second, different application can be invoked by an administrative user to perform management with respect to a machine-readable link.

The computing device 202 further includes an image capture device 210, which is able to capture an image of an object 212 that includes a machine-readable link 214. The object 212 can be a document, a paper or other substrate, a three-dimensional object, a display screen, and so forth. The application 208 can process the image of the object 212 to detect the machine-readable link 214, such as by comparing the image of the object 212 or a portion of the image of the object 212) with a database of images of machine-readable links to identify a matching machine-readable link.

The computing device 202 also includes a display device 218, which can display a user interface (UI) 218. If the application 208 is set in the consumer mode, then the UI 218 allows a user, of the computing device 202 to view the payoff content associated with the machine-readable link 214. If the application 208 is set in the administrative mode, then the UI 218 is a management UI that includes various user-selectable control items to allow a user to perform management tasks with respect to the machine-readable link 214. The management UI 218 can also be used to display analytics information associated with the machine-readable link 214.

The linking system 204 includes a network interface 224 to communicate over the network 222. In addition, the linking system includes one or multiple processors 226, and a non-transitory machine-readable storage medium for storage media) 228.

The machine-readable storage medium (or storage media) 228 can store link control instructions 230, a link-payoff database 232, and an administrative user identifier database 234. The link-payoff database 232 associates machine-readable links with corresponding payoff content. The administrative user identifier database 234 includes one or multiple identifiers of users with administrative privileges with respect to one or multiple machine-readable links.

Figure 1B:
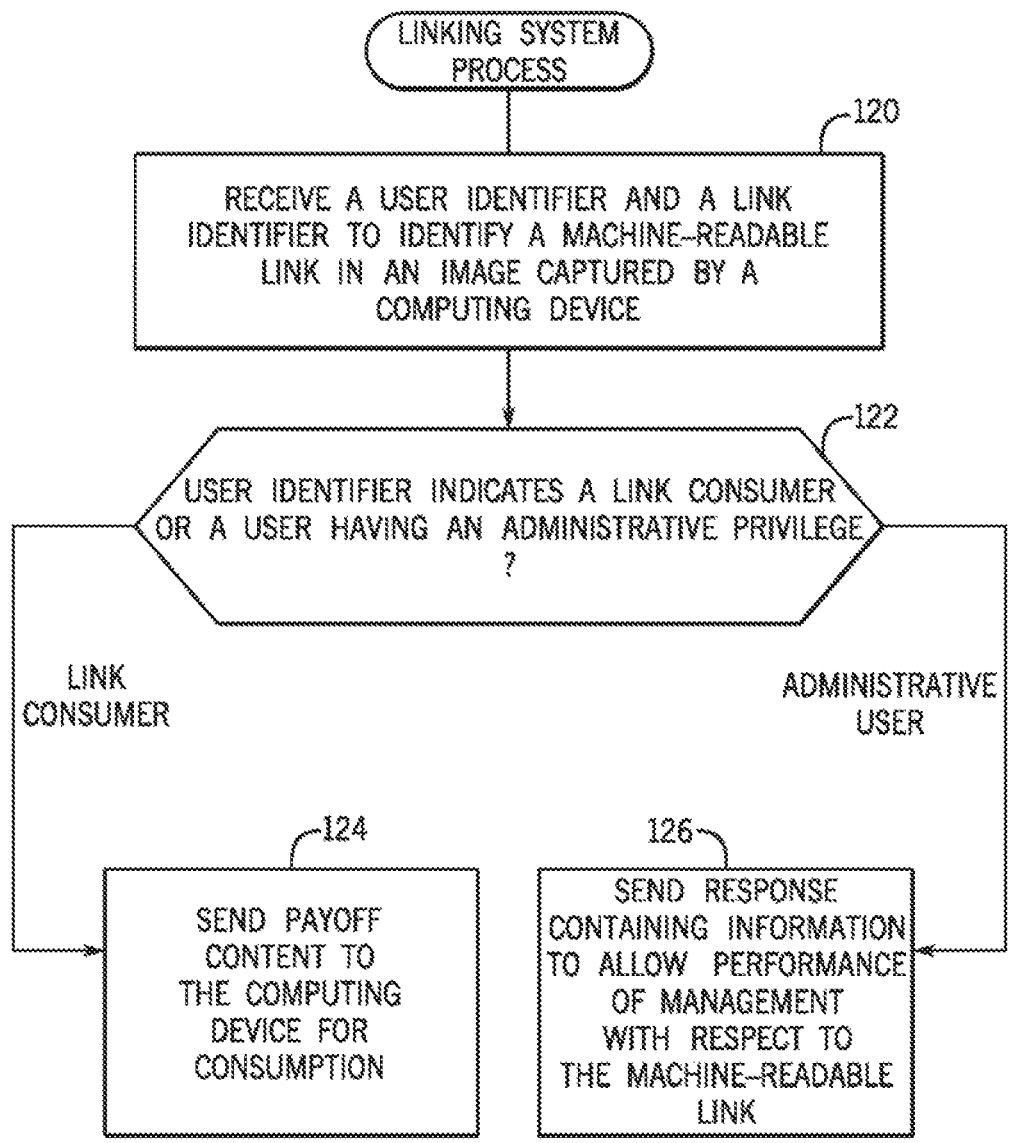

The link control instructions 230 are executable on the processor(s) 226 to perform various tasks, including tasks depicted in FIG. 1A or 1B. As examples, the link control instructions 230 can include a user resolver 230-1, a link resolver 230-2, and an administrative control logic 230-3. The user resolver 230-1 can determine whether or not a user identifier received from the computing device 202 indicates a link consumer or a user with an administrative privilege. As examples, the user resolver 230-1 can compare the received user identifier with identifier(s) in the administrative user identifier database 234. If the received user identifier matches any of the identifier(s) in the administrative user identifier database 234, then the user resolver 230-1 determines that the received user identifier indicates a user with an administrative privilege. On the other hand, if the received user identifier does not match any of the identifier(s) in the administrative user identifier database 234, then the user resolver 230-1 determines that the received user identifier indicates a link consumer.

The link resolver 230-2 uses a link identifier received from the computing device 202 to retrieve corresponding payoff content from the link-payoff database 232. In some implementations, the link resolver 230-2 can use the link identifier and at least one additional factor to identify the payoff content to retrieve. For a given link identifier, there can be multiple payoff content that can be selected based on the at least one factor. As noted above, the at least one factor is selected from among any or some combination of the following: a location of the computing device 202 that detected the given machine-readable link, a timestamp from the computing device 202, historical data associated with usage of the given machine-readable link, information about characteristics of the computing device 202, information about an environment of the computing device 202, and information about the link consumer.

The location of the computing device 202 may be indicated by location information, such as GPS coordinates or other location information, from the computing device 202. The historical data can include data relating to information previously served to the computing device 202 for the machine-readable link, such as payoff content selected by a link consumer.

Information about the characteristics of the computing device 202 can include any or some combination of the following: a brand of the computing device 202, a version of the computing device 202, an operating system of the computing device 202, a version of the operating system, a display size or resolution, an installed application, and so forth. Information about the environment of the computing device 202 can include any or some combination of the following: a temperature, a brightness, a humidity, and so forth. Information about the link consumer can include any or some combination of the following: age, gender, social networking activities, user authentication information, and so forth.

The administrative control logic 230-3 can provide a response and can perform management tasks with respect to a machine-readable link, in response to the user resolver 230-1 determining that a user identifier indicates a user with an administrative privilege.

Figure 3:
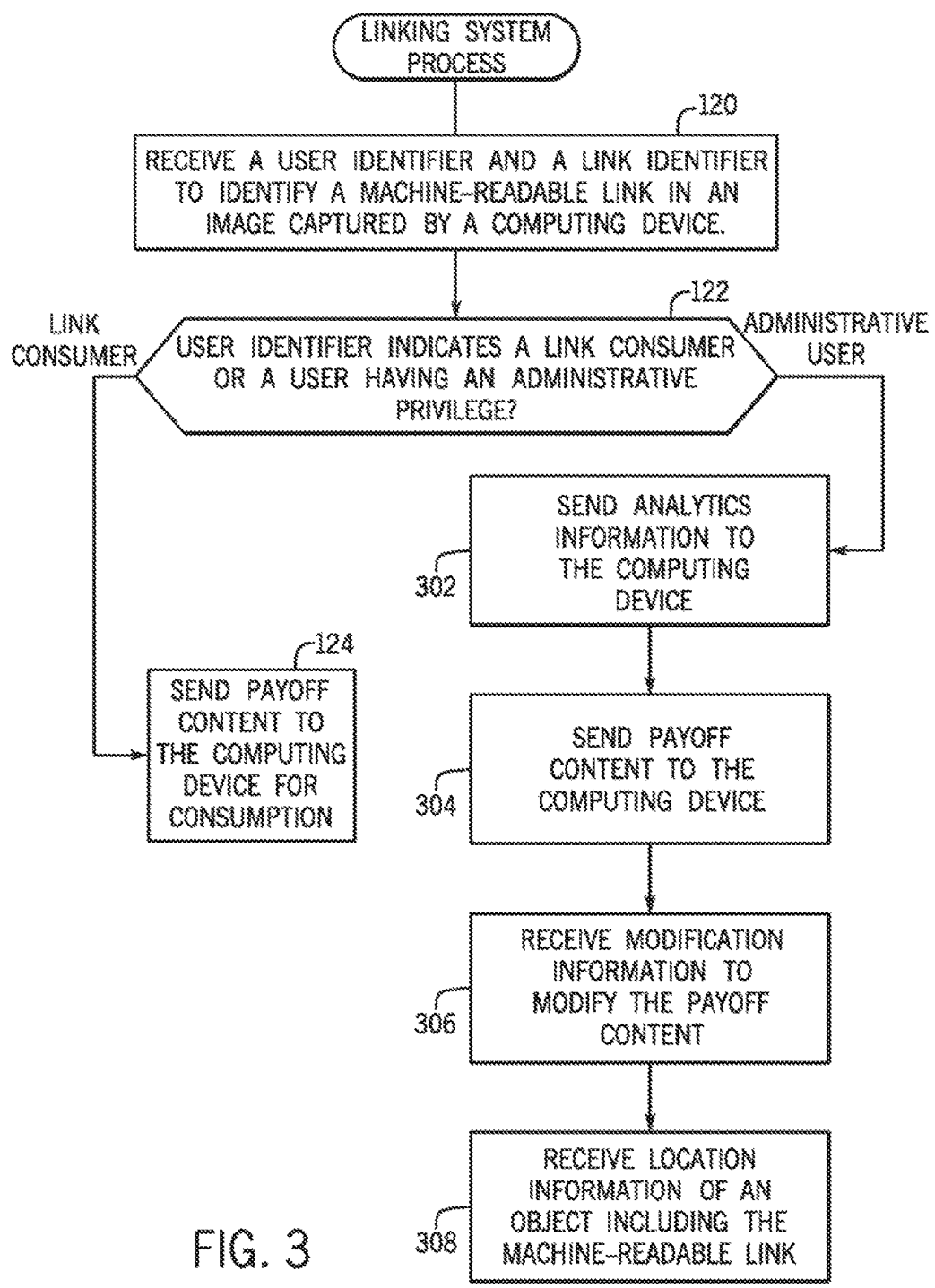
FIG. 3 is a flow diagram of a process performed by a linking system, according to further implementations.

FIG. 3 is a flow diagram of a process of the linking system 204 according to further implementations. Tasks 120, 122, and 124 in FIG. 3 are the same as or similar to respective tasks in FIG. 1B. FIG. 3 further depicts additional tasks that can be performed by the link control instructions 230 of the linking system 204. In response to determining that the user identifier indicates a user having an administrative privilege with respect to a machine-readable link, the linking system 204 can send (at 302) analytics information associated with the machine-readable link to the computing device 202. In addition, the linking system 204 can send (at 304) the payoff content of the machine-readable link to the computing device 202. The linking system 204 can also receive (at 306) modification information from the computing device 202 to modify the payoff content of the machine-readable link. The modification information can include a message (or messages) specifying a change to be made to the payoff content. In addition, the linking system 204 can receive (at 308) location information of an object including the machine-readable link.

Figure 4:
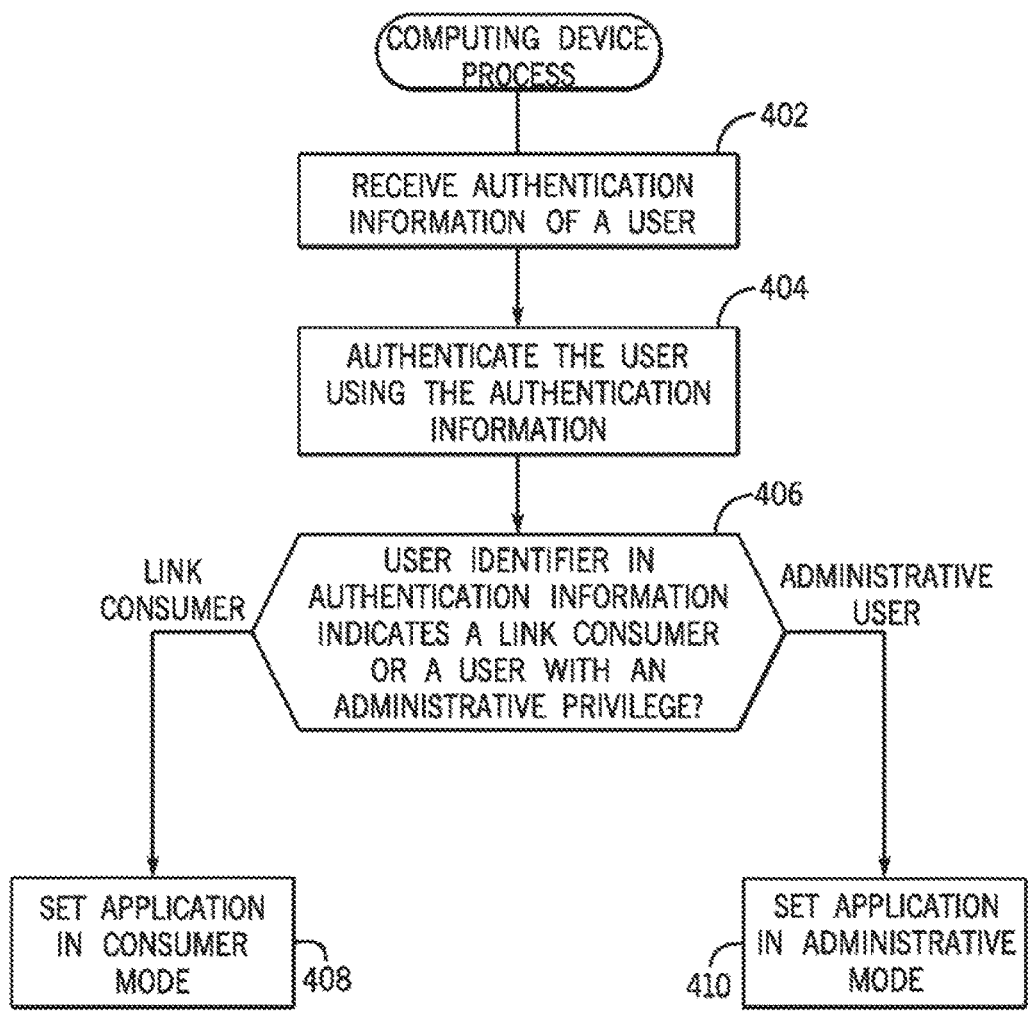
FIG. 4 is a flow diagram of a process performed by a computing device according to some implementations.

FIG. 4 is a flow diagram of a process performed by the computing device 202, according to some implementations. More specifically, the task of FIG. 4 can be performed by the application 208 of FIG. 2 that runs in the computing device 202.

The application 208 receives (at 402) authentication information from a user of the computing device 202. The application 208 then authenticates (at 404) the user based on the received authentication information. The authentication information can include a user identifier as well as other information, such as a password, a security key, or other information useable for authenticating the user.

The application 208 determines (at 406) whether the user identifier indicates a link consumer or a user with an administrative privilege. This determination is used by the application 208 to selectively set the application 208 into a consumer mode or an administrative mode. If the user identifier indicates that the user is a link consumer, then the application 208 sets (at 408) itself in the consumer mode, where detection of a machine-readable link causes the application 208 to retrieve payoff content for consumption (viewing or other use) by the user.

On the other hand, if the application 208 determines that the user identifier indicates a user with an administrative privilege with respect to the machine-readable link, then the application 208 sets at 410) itself in the administrative mode. In the administrative mode, the application 208 can receive a response that contains information to allow for management with respect to the machine-readable link.

Using techniques or r mechanisms according to some implementations, an administrative user may more easily perform management tasks with respect to a machine-readable link. The administrative user can manage a machine-readable link without having to remember specific information about the machine-readable link, since the administrative user can simply capture the machine-readable link that the administrative user wishes to manage to trigger the ability to perform management tasks.

As discussed above, machine-readable instructions for performing tasks according to some implementations can be stored on one or multiple computer-readable or machine-readable storage media. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a system, a user identifier and a link identifier to identify a machine-readable link in an image captured by a first device of a user;
determining, by the system, whether the user identifier indicates that the user is an administrator having an administrative privilege with respect to the machine-readable link or that the user is a consumer having a consumption privilege with respect to the machine-readable link;
in response to determining that the user identifier indicates that the user is the consumer, sending, by the system to the first device, content associated with the machine-readable link for viewing by the user on the first device; and
in response to determining that the user identifier indicates that the user is the administrator, sending, by the system to the first device, a response containing information to allow performance of management with respect to the content associated with the machine-readable link, and permitting the user to change the content associated with the machine-readable link that is viewed by the consumer.

2. The method of claim 1, wherein the receiving comprises receiving a message containing the user identifier and the link identifier, the message indicative of capture of the image containing the machine-readable link by the first device.

3. The method of claim 1, further comprising:
receiving, by the system from the first device, modification information to modify payoff content associated with the machine-readable link, the modification information being responsive to the response.

4. The method of claim 1, wherein the user identifier and the link identifier are received in association with a request, the method further comprising receiving an identifier of an application in the first device used to make the request, wherein sending the response is further based on the identifier of the application.

5. The method of claim 1, further comprising:
receiving, by the system from the first device, information identifying a location of an object including the machine-readable link, the information being responsive to the response.

6. The method of claim 5, further comprising:
recording, by the system, the information identifying the location of the object in a database that correlates machine-readable links with corresponding locations.

7. The method of claim 1, wherein sending the response comprises sending the response that includes analytics information relating to usage of the machine-readable link.

8. A system comprising:
at least one processor; and
a non-transitory machine-readable storage medium comprising executable instructions to cause the at least one processor to:
receive a message including a user identifier and a link identifier to identify a machine-readable link in an image captured by a first device of a user, the message being indicative of detection of the machine-readable link by the first device;
determine whether the user identifier indicates that the user is a consumer having a consumption privilege of content associated with the machine-readable link or is an administrator having an administrative privilege with respect to the machine-readable link;
in response to determining that the user identifier indicates that the user is the administrator, send, to the first device, a response containing information to allow performance of management with respect to the machine-readable link, and permit the user to change the content associated with the machine-readable link that is viewed by the consumer; and
in response to determining that the user identifier indicates that the user is the consumer, send, to the first device, the content associated with the machine-readable link for viewing by the user at the first device.

9. The system of claim 8, wherein sending the content for viewing at the first device comprises sending dynamic content that is variable according to at least one parameter received by the system, the at least one parameter selected from the group consisting of a location of the first device, a timestamp from the first device, historical data associated with usage by the user relating to the machine-readable link, information regarding the first device, information about an environment of the first device, and information about the user.

10. The system of claim 8, wherein sending the response comprises sending the response that includes analytics information associated with usage relating to the machine-readable link.

11. The system of claim 8, wherein the at least one processor is to further:
receive, from the first device, modification information to modify content associated with the machine-readable link, the modification information being responsive to the response.

12. An article comprising at least one non-transitory computer-readable storage medium storing instructions that upon execution cause a computing device to:
receive a user identifier and a link identifier to identify a machine-readable link in an image captured by a first device of a user;
determine whether the user identifier indicates that the user is an administrator having an administrative privilege with respect to the machine-readable link or that the user is a consumer having a consumption privilege with respect to the machine-readable link;
in response to determining that the user identifier indicates that the user is the consumer, send content associated with the machine-readable link for viewing by the user on the first device; and
in response to determining that the user identifier indicates that the user is the administrator, send a response containing information to allow performance of management with respect to the content associated with the machine-readable link, and permitting the user to change the content associated with the machine-readable link that is viewed by the consumer.

13. The article of claim 12, wherein the instructions are executable to:
in response to determining that the user identifier indicates that the user is the administrator, display a management user interface including at least one control item selectable to modify the content associated with the machine-readable link.

* * * * *